(12) United States Patent
Iwata et al.

(10) Patent No.: US 9,932,264 B2
(45) Date of Patent: Apr. 3, 2018

(54) BIO-SOLUBLE INORGANIC FIBER

(71) Applicant: NICHIAS CORPORATION, Tokyo (JP)

(72) Inventors: Koji Iwata, Tokyo (JP); Hideki Kitahara, Tokyo (JP); Ken Yonaiyama, Tokyo (JP); Kazuki Soeda, Tokyo (JP); Tatsuro Miki, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 0 days.

(21) Appl. No.: 15/324,046

(22) PCT Filed: Oct. 15, 2014

(86) PCT No.: PCT/JP2014/005215
§ 371 (c)(1),
(2) Date: Jan. 5, 2017

(87) PCT Pub. No.: WO2016/020959
PCT Pub. Date: Feb. 11, 2016

(65) Prior Publication Data
US 2017/0197872 A1    Jul. 13, 2017

(30) Foreign Application Priority Data

Aug. 8, 2014    (JP) ................................ 2014-163059

(51) Int. Cl.
| | |
|---|---|
| C03C 13/00 | (2006.01) |
| C03C 3/087 | (2006.01) |
| C03C 4/00 | (2006.01) |
| C03C 4/20 | (2006.01) |
| D01F 9/08 | (2006.01) |
| D01D 5/08 | (2006.01) |

(52) U.S. Cl.
CPC .............. *C03C 13/00* (2013.01); *C03C 3/087* (2013.01); *C03C 4/0014* (2013.01); *C03C 4/20* (2013.01); *D01D 5/08* (2013.01); *D01F 9/08* (2013.01); *C03C 2204/00* (2013.01); *C03C 2213/02* (2013.01); *D10B 2401/12* (2013.01)

(58) Field of Classification Search
CPC .................................. C03C 13/00; D01F 9/08
See application file for complete search history.

(56) References Cited

U.S. PATENT DOCUMENTS

| | | | |
|---|---|---|---|
| 5,874,375 A | 2/1999 | Zoitos et al. | |
| 6,861,381 B1 | 3/2005 | Jubb et al. | |
| 8,940,134 B2 * | 1/2015 | Ishihara | D21H 13/36 |
| | | | 162/145 |
| 2003/0162019 A1 | 8/2003 | Zoitos et al. | |
| 2005/0014624 A1 * | 1/2005 | Jubb | C03C 13/00 |
| | | | 501/35 |
| 2006/0094583 A1 | 5/2006 | Freeman et al. | |
| 2010/0055457 A1 | 3/2010 | Jubb | |
| 2012/0168665 A1 | 7/2012 | Kitahara et al. | |
| 2012/0171486 A1 | 7/2012 | Kitahara et al. | |
| 2012/0247156 A1 | 10/2012 | Kitahara et al. | |
| 2012/0255697 A1 * | 10/2012 | Ishihara | D21H 13/36 |
| | | | 162/164.6 |
| 2014/0356622 A1 * | 12/2014 | Nakajima | C03C 13/00 |
| | | | 428/379 |
| 2015/0163861 A1 | 6/2015 | Mihara et al. | |

FOREIGN PATENT DOCUMENTS

| | | |
|---|---|---|
| EP | 2 628 717 A1 | 8/2013 |
| EP | 2634308 A1 | 9/2013 |
| JP | H10-512232 | 11/1998 |
| JP | 2003-089547 A | 3/2003 |
| JP | 2003-509320 A | 3/2003 |
| JP | 2004-036050 A | 2/2004 |
| JP | 2005-515307 A | 5/2005 |
| JP | 2008-518119 A | 5/2008 |
| JP | 2010-511105 A | 4/2010 |
| JP | 4977253 B1 | 7/2012 |
| JP | 2012-148947 A | 8/2012 |
| JP | 5006979 B1 | 8/2012 |
| JP | 5138806 B1 * | 2/2013 ............. C03C 13/00 |
| JP | 5277337 B1 | 8/2013 |
| WO | 2003/060016 A1 | 7/2003 |

OTHER PUBLICATIONS

Jan. 20, 2015 International Search Report issued in Patent Application No. PCT/JP2014/005215.
Aug. 21, 2014 Explanation for Accelerated Examination in Japanese Patent Application No. 2014-163059.
Sep. 1, 2014 Office Action issued in Japanese Patent Application No. 2014-163059.
Jan. 20, 2015 Written Opinion issued in Patent Application No. PCT/JP2014/005215.
Feb. 6, 2018 Supplementary European Search Report issued in European Application No. 14899219.1.

* cited by examiner

*Primary Examiner* — Elizabeth A. Bolden
(74) *Attorney, Agent, or Firm* — Oliff PLC

(57) ABSTRACT

Inorganic fibers including the following composition, $SiO_2$, MgO and CaO being main components: $SiO_2$: 73.6 wt % to 85.9 wt %, MgO: 9.0 wt % to 21.3 wt %, CaO: 5.1 wt % to 12.4 wt %, $Al_2O_3$: 0 wt % or more and less than 2.3 wt %, and $Fe_2O_3$: 0 wt % to 0.50 wt %.

16 Claims, No Drawings

BIO-SOLUBLE INORGANIC FIBER

TECHNICAL FIELD

The invention relates to bio-soluble inorganic fibers.

BACKGROUND ART

Asbestos have been used as a heat-resistant sealing material, for example, since they are light in weight and have excellent heat resistance. However, use of asbestos is prohibited since it causes disorders of lungs. Therefore, instead of asbestos, ceramic fibers or the like have been used. It is thought that ceramic fibers or the like have excellent heat resistance which is equivalent to that of asbestos, and no health problem may occur as long as they are handled appropriately. However, there is a trend that a higher degree of safety is required. Under such circumstances, various bio-soluble fibers have been developed in order to realize bio-soluble fibers which do not cause or hardly causes health problems even if they are inhaled in a human body (see Patent Document 1, for example).

Like asbestos, conventional inorganic fibers are secondary processed into a shaped product or an unshaped product together with various binders or additives, and are used as a joint in a heat treating apparatus, a furnace such as an industrial furnace, an incinerator or the like, a joint which fills the gap of refractory tiles, insulating bricks, shell, refractory mortar or the like, a sealing material, a packing material, an insulating material, or the like. In many cases, the inorganic fibers in use are exposed to high temperatures, and they are required to have heat resistance.

Further, in many cases, alumina is used in a member of a furnace. There was a problem that fibers contained in a secondary-processed product react with the alumina, thereby causing the secondary product or the member to adhere and melt.

RELATED ART DOCUMENTS

Patent Documents

Patent Document 1: JP-A-2012-148947

SUMMARY OF THE INVENTION

An object of the invention is to provide inorganic fibers having excellent bio-solubility, heat resistance and alumina reactivity resistance.

According to the invention, the following inorganic fibers or the like are provided.

1. Inorganic fibers comprising the following composition, $SiO_2$, MgO and CaO being main components:
   $SiO_2$: 73.6 wt % to 85.9 wt %
   MgO: 9.0 wt % to 15.0 wt %
   CaO: 5.1 wt % to 12.4 wt %
   $Al_2O_3$: 0 wt % or more and less than 2.3 wt %
   $Fe_2O_3$: 0 wt % to 0.50 wt %
   SrO: less than 0.1 wt %.
2. The inorganic fibers according to 1, which have the following composition:
   $SiO_2$: 74.0 wt % to 80.0 wt %
   MgO: 9.0 wt % to 15.0 wt %
   CaO: 5.1 wt % to 12.4 wt %
   $Al_2O_3$: 0 wt % or more and less than 2.3 wt %
   $Fe_2O_3$: 0 wt % to 0.50 wt %
   SrO: less than 0.1 wt %.
3. The inorganic fibers according to 1 or 2, which comprise MgO in an amount of 9.0 wt % to 14.0 wt %.
4. The inorganic fibers according to any one of 1 to 3, which comprise $Al_2O_3$ in an amount of 0.17 wt % to 2.2 wt %.
5. The inorganic fibers according to any one of 1 to 4, which comprise $ZrO_2$ in an amount of more than 0.1 wt % and 10.9 wt % or less.
6. The inorganic fibers according to any one of 1 to 5, which comprise $TiO_2$ in an amount of more than 0.1 wt % and 10.9 wt % or less.
7. The inorganic fibers according to any one of 1 to 6, which comprise alkali metal oxide in an amount of more than 0.01 mol % and less than 0.20 mol %.
8. The inorganic fibers according to any one of 1 to 7, which comprise $B_2O_3$ in an amount of less than 0.1 wt %.
9. The inorganic fibers according to any one of 1 to 8, wherein the total of the amounts of $SiO_2$, MgO and CaO is 90.0 wt % or more.
10. The inorganic fibers according to any one of 1 to 9, wherein the total of the amounts of $SiO_2$, MgO and CaO is 93.0 wt % or more.
11. The inorganic fibers according to any one of 1 to 10, wherein the total of the amounts of $SiO_2$, MgO and CaO is 96.0 wt % or more.
12. A secondary product or composite material produced by using the inorganic fibers according to any one of 1 to 11.

According to the invention, it is possible to provide inorganic fibers having excellent bio-solubility, heat resistance and alumina reactivity resistance.

MODE FOR CARRYING OUT THE INVENTION

The inorganic fibers of the invention comprises the following composition, wherein $SiO_2$, MgO and CaO are main components:
$SiO_2$: 73.6 wt % to 85.9 wt %
MgO: 9.0 wt % to 21.3 wt %
CaO: 5.1 wt % to 12.4 wt %
$Al_2O_3$: 0 wt % or more and less than 2.3 wt %
$Fe_2O_3$: 0 wt % to 0.50 wt %.

The main components mean that, among all the components contained in the inorganic fibers, the three components of which the contents (wt %) are the highest, i.e. the component which is firstly high in content, the component which is secondary high in content, and the component which is thirdly high in content, are $SiO_2$, MgO and CaO.

In this specification, "○wt % to Δwt %" means "○wt % or more and Δwt % or less".

In respect of heat resistance, the main three components preferably have the following composition:
$SiO_2$: 74.0 wt % to 80.0 wt %
MgO: 9.0 wt % to 18.0 wt %
CaO: 5.1 wt % to 12.4 wt %.

More preferably, the main three components have the following composition:
$SiO_2$: 74.2 wt % to 78.4 wt %
MgO: 9.7 wt % to 16.1 wt %
CaO: 5.2 wt % to 12.2 wt %.

In the inorganic fibers of the invention, the lower limit of the amount of $SiO_2$ can be 73.6 wt % or more, 73.7 wt % or more, 74.2 wt % or more, 74.4 wt % or more, 75.0 wt % or more, or 75.8 wt % or more, for example. The upper limit of the amount of $SiO_2$ can be 85.9 wt % or less, 82.0 wt % or less, 81.0 wt % or less, 80.0 wt % or less, or 78.0 wt % or less, for example. These lower limits and these upper limits can be combined arbitrarily.

In the inorganic fibers of the invention, the lower limit of the amount of MgO can be 9.0 wt % or more, 9.2 wt % or more, 9.4 wt % or more, 9.6 wt % or more, 9.7 wt % or more, 10.0 wt % or more, 11.0 wt % or more, or 11.8 wt % or more, for example. The upper limit of the amount of MgO can be 21.3 wt % or less, 20.0 wt % or less, 18.0 wt % or less, 16.0 wt % or less, 15.0 wt % or less, 14.0 wt % or less, or 13.5 wt % or less, for example. These lower limits and these upper limits can be combined arbitrarily.

In the inorganic fibers of the invention, the lower limit of the amount of CaO can be 5.1 wt % or more, 5.9 wt % or more, 6.5 wt % or more, or 7.7 wt % or more, for example. The upper limit of the amount of CaO may be 12.4 wt % or less, 12.2 wt % or less, 11.2 wt % or less, or 10.2 wt % or less, for example. These lower limits and these upper limits can be combined arbitrarily.

The total of the amount of $SiO_2$, MgO and CaO may be 87.5 wt % or more, 90.0 wt % or more, 92.0 wt % or more, 94.0 wt % or more, 96.0 wt % or more, 98.0 wt % or more, 99.5 wt % or more, or 100.0 wt % (inevitable impurities may be contained).

The remaining other than the above components is oxides of the other elements, impurities or the like.

In the inorganic fibers of the invention, the lower limit of the amount of $Fe_2O_3$ can be 0.00 wt % or more, or more than 0.00 wt %, for example. The upper limit of the amount of $Fe_2O_3$ can be 0.60 wt % or less, 0.50 wt % or less, 0.40 wt % or less, 0.3 wt % or less, or 0.20 wt % or less, for example. When the amount of $Fe_2O_3$ is too much, the fibers may color with heat, or crystallization may be accelerated so that the strength may be lowered. Also, the heat resistance may be lowered. The lower limit and the upper limit can be combined arbitrarily.

In the inorganic fibers of the invention, the lower limit of the amount of $Al_2O_3$ can be 0.0 wt % or more, more than 0.0 wt %, 0.15 wt % or more, or 0.17 wt % or more, for example. The upper limit of the amount of $Al_2O_3$ can be less than 2.3 wt %, 2.2 wt % or less, 2.0 wt % or less, 1.8 wt % or less, 1.6 wt % or less, 1.5 wt % or less, 1.4 wt % or less, 1.3 wt % or less, or 1.2 wt % or less, for example. These lower limits and these upper limits can be combined arbitrarily.

$TiO_2$ and $ZrO_2$ may be contained or not may be contained, respectively. The respective lower limit of the amount thereof can be 0 wt % or more, 0.1 wt % or more, 0.15 wt % or more, 0.5 wt % or more, 1.0 wt % or more, 1.5 wt % or more, 2.0 wt % or more, or 2.5 wt % or more, for example. The respective upper limit of the amount thereof can be 12.4 wt % or less, 12.0 wt % or less, 10.0 wt % or less, 8.0 wt % or less, 6.0 wt % or less, 5.0 wt % or less, 3.0 wt % or less, 2.3 wt % or less, 2.0 wt % or less, 1.0 wt % or less, 0.5 wt % or less, less than 0.1 wt %, or 0.05 wt % or less, for example. These lower limits and these upper limits can be combined arbitrarily.

$ZrO_2$ is preferably contained in an amount of 0.5 wt % to 8.0 wt %, or 3.0 wt % to 7.0 wt %, more preferably 3.5 wt % to 6.0 wt %. The lower limit of the amount of $ZrO_2$ can be 5.05 wt % or more, or 5.5 wt % or more.

$TiO_2$ is preferably contained in an amount of 0.5 wt % to 8.0 wt %, more preferably 1.0 wt % to 7.0 wt %.

The inorganic fibers of the invention can contain one or two or more components selected from $Al_2O_3$, $ZrO_2$ and $TiO_2$ in the above-mentioned amounts.

The inorganic fibers preferably have the following composition, wherein $SiO_2$, MgO and CaO are main components:
  $SiO_2$: 73.6 wt % to 85.9 wt %
  MgO: 9.0 wt % to 21.3 wt %
  CaO: 5.1 wt % to 12.4 wt %
  $Al_2O_3$: less than 2.3 wt %
  $Fe_2O_3$: 0 wt % to 0.50 wt %
  $ZrO_2$: 0.00 wt % to 0.05 wt %.

The inorganic fibers preferably have the following composition, wherein $SiO_2$, MgO and CaO are main components:
  $SiO_2$: 73.6 wt % to 85.9 wt %
  MgO: 9.0 wt % to 21.3 wt %
  CaO: 5.1 wt % to 12.4 wt %
  $Al_2O_3$: less than 2.3 wt %
  $ZrO_2$: 3.0 wt % to 7.0 wt %.

The inorganic fibers preferably have the following composition, wherein $SiO_2$, MgO and CaO are main components:
  $SiO_2$: 73.6 wt % to 85.9 wt %
  MgO: 9.0 wt % to 21.3 wt %
  CaO: 5.1 wt % to 12.4 wt %
  $Al_2O_3$: less than 2.3 wt %
  $ZrO_2$: 0.0 wt % to 7.0 wt %
  $TiO_2$: 0.5 wt % to 8.0 wt %.

The inorganic fibers of the invention may or may not contain an oxide of an element selected from Sc, La, Ce, Pr, Nd, Sm, Eu, Gd, Tb, Dy, Ho, Er, Tm, Yb, Lu and Y, or a mixture thereof. The oxides may be contained in an amount of 3.0 wt % or less, 2.0 wt % or less, 1.0 wt % or less, or 0.5 wt % or less, respectively.

Each of alkaline metal oxides such as $Na_2O$, $Li_2O$ and $K_2O$ may or may not be contained. The amount thereof can each or in total be 3 wt % or less, 2 wt % or less, 1 wt % or less, 0.5 wt % or less, 0.4 wt % or less, 0.3 wt % or less, 0.2 wt % or less, or 0.10 wt % or less.

Alternatively, the amount thereof may be more than 0.01 mol % and less than 0.20 mol %.

Each of ZnO, $B_2O_3$, $P_2O_5$, SrO, BaO and $Cr_2O_3$ may or may not contained. The amount thereof can each be 3.0 wt % or less, 2.0 wt % or less, 1.0 wt % or less, 0.5 wt % or less, less than 0.1 wt %, or 0.05 wt % or less.

The amounts of respective components mentioned above may be combined arbitrarily.

The inorganic fibers can be produced by a known method such as a melting method or a sol-gel method. A melting method is preferably because of the low cost. In the melting method, fibers are prepared by preparing a melt of raw materials in the customary manner, and allowing the melt to be fibrous. For example, fibers can be prepared by a spinning method in which a molten raw material is flown onto a wheel which is rotating at a high speed, or by a blowing method in which compressed air is applied to a molten raw material.

The average fiber diameter of the inorganic fibers of the invention is normally 0.1 to 50 μm, preferably 0.5 to 20 μm, further preferably 1 to 10 μm, and most preferably 1 to 8 μm. The average fiber diameter may be adjusted to be an intended value by a known production method such as the number of rotation, acceleration, compressed air pressure, air flow velocity, air flow amount or the like.

The inorganic fibers of the invention may or may not be subjected to a heat treatment.

If a heat treatment is conducted, the temperature may be a temperature at which the fiber shape be retained. Since the physical properties of the fibers vary by the heating temperature and the heating time, the fibers may be treated appropriately such that desired performance (creep resistance, shrinkage, strength, elasticity) can be exhibited.

The inorganic fibers change from amorphous to crystalline by a certain heat treatment. As mentioned above, it suffices that desired performance is exhibited. The inorganic fibers may be either amorphous or crystalline, or may be a state in which an amorphous part and a crystalline part are mixed.

The heating temperature is preferably 600° C. or higher, or 800° C. or higher, more preferably 1000° C. or higher, 1200° C. or higher, 1300° C. or higher, or 1400° C. or higher. The heat temperature is preferably in a range of 600° C. to 1400° C., more preferably 700° C. to 1200° C., 800° C. to 1200° C., 700° C. to 1000° C., or 800° C. to 1000° C.

By having the above-mentioned composition, the inorganic fibers of the invention are dissolved in physiological saline having a pH of 7.4. Further, they have solubility even after heating (after crystallizing).

The dissolution velocity constant that is measured by the same method as used in Examples is preferably 100 ng/cm$^2 \cdot$h or more, 150 ng/cm$^2 \cdot$h or more, 200 ng/cm$^2 \cdot$h or more, 300 ng/cm$^2 \cdot$h or more, 500 ng/cm$^2 \cdot$h or more, or 1000 ng/cm$^2 \cdot$h or more.

The inorganic fibers of the invention have low alumina reactivity. Preferably, the inorganic fibers do not react with alumina at least at 1300° C. Not reacting with alumina means that, when evaluated by the method as used in Examples, an alumina pellet does not adhere due to melting to a fleece or a blanket made from the fiber, namely the state other than that is evaluated as poor (x).

The heat shrinkage of the fiber, when measured by the method as used in Examples, is preferably 20% or less, more preferably 10% or less, the most preferably 5% or less, or 3% or less, with heating at 1200° C., 1300° C., 1350° C. or 1400° C. for 8 hours. It is preferably 10% or less with heating at 1300° C. for 100 hours.

The fibers of the invention are excellent in tensile strength. The tensile strength of the fiber is preferably 45 kPa or higher measured by the method as used in Examples.

Various secondary products can be obtained from the fibers of the invention. For example, a shaped product such as bulk, blanket, block, rope, yarn, textile fabrics, fiber applied with a surfactant, shot-less bulk in which shots (un-fibrous product) have been reduced or removed, a board produced by using a solvent such as water, a mold, paper, felt, wet felt impregnated with colloidal silica, or the like can be obtained. Further, a shaped product obtained by treating these shaped products with colloid or the like can be obtained. Further, an unshaped product (mastic, caster, coating material or the like) produced by using a solvent such as water can be obtained. In addition, a structural body obtained by combining the shaped product or the unshaped product, and various heaters can be obtained.

As specific applications of the fibers of the invention, a joint in a heat treating apparatus or a furnace such as an industrial furnace and an incinerator, a joint which fills the gap of refractory tiles, insulating bricks, shell, refractory mortar or the like, a sealing material, a packing material, a cushion material, an insulating material, a refractory material, a fire proofing material, a heat-retention material, a protective material, a coating material, a filtering material, a filter material, an insulating material, a joint, a filler, a repairing material, a heat resistant material, a non-combustible material, a sound proof material, a sound absorbing material, a friction material (an additive for brake pad, for example), a glass plate/steel plate conveying roll, an automobile catalyst carrier retaining material, various fiber-reinforced composite materials (reinforcing fibers for fiber-reinforced cement or fiber-reinforced plastics, reinforcing fibers for a heat resistant material or a refractory material, and reinforcing fibers for an adhesive or a coating material, for example) can be given.

EXAMPLES

Examples 1 to 80 and Comparative Examples 1 to 14

The fibers having the composition shown in Tables 1 and 2 were prepared by a melting method, and evaluated by the following methods. The results are shown in Tables 1 and 2. Blanks in the composition in the tables mean that the content is below the detection limit (less than about 0.01 wt %).

(Heat Resistance)

Heat shrinkage was measured as the evaluation of heat resistance of the fiber.

The heat shrinkage of the fiber was measured before and after heating at predetermined temperatures between 1200° C. to 1400° C. for 8 hours or 100 hours for a fleece or a blanket made from the fiber (a size of 150 mm in length, 50 mm in width, and 5 to 50 mm in thickness).

Platinum pins were driven at two or more points on the surface of each sample made, and the distance between the platinum pins was measured before and after heating. The dimensional change was evaluated as the heat shrinkage.

(Alumina Reactivity Resistance)

About 1 g of alumina powder having purity of 99% or more was press-molded by means of a mold having a diameter of 17 mm to obtain a pellet. The pellet was placed on a fleece or blanket sample (50 mm×50 mm, thickness: 5 to 50 mm) that was made from the fiber. The sample on which the pellet was placed was heated at 1300° C. for 8 hours to confirm the reactivity after the heating. The sample which did not react with the pellet at all was evaluated as very good (⊚). The sample to which the pellet adhered weakly (the pellet could be peeled off by hand, and the pellet and the sample were not molten by appearance) was evaluated as good (○). The sample which reacted with the pellet (the pellet and the sample were molten and adhered to each other) was evaluated as poor (x).

(Bio-Solubility)

The bio-solubility of the unheated fibers and the fibers after heating at 1300° C. for 8 hours were measured by the following method.

The fibers were placed on a membrane filter. On the fibers, physiological saline having a pH of 7.4 was added dropwise from a micro pump. The filtrate which had passed through the fibers and the filter was collected in a container. The collected filtrate was taken out after the passage of 24 hours. The eluent components were quantified by an ICP emission analyzer to calculate the solubility. The elements to be measured were three elements, i.e. Si, Mg and Ca, that were main elements. The average fiber diameter was measured and the solubility was converted using the average fiber diameter to the dissolution rate constant (unit: ng/cm$^2 \cdot$h), which was the eluent amount per unit surface area·unit time.

(Average Fiber Diameter)

400 or more fibers were observed and photographed by an electron microscope. Thereafter, the diameter was measured for the photographed fibers, and the average value of all measured diameters was taken as the average fiber diameter.

(Tensile Strength)

The fiber was subjected to needling processing to produce a blanket. A tensile strength was measured by means of a universal tester. As the blanket, a sample having a density of about 128 kg/m$^3$ and a size of 50 mm in width and 25 mm in thickness was used. As for the testing conditions, both ends were fastened such that a span was 100 mm and a tensile speed was 20 mm/min. The value of the maximum load under which the test sample was broken was taken as a tensile strength.

TABLE 1

| | Composition (wt %) | | | | | | | | | | Shrinkage after heating for 8 hours (%) | | | | Shrinkage after heating for 100 hours (%) | Solubility (unheated) PH 7.4 | Solubility (after heating) PH 7.4 | Alumina reactivity resistance 1300° C. 8 h | Average fiber diameter (μm) | Tensile strength (kPa) |
|---|---|---|---|---|---|---|---|---|---|---|---|---|---|---|---|---|---|---|---|---|
| | MgO | CaO | SiO2 | Al2O3 | Na2O | K2O | Fe2O3 | MoO3 | TiO2 | ZrO2 | 1200° C. | 1300° C. | 1350° C. | 1400° C. | 1300° C. | | | | | |
| Example 1 | 19.2 | 5.2 | 74.0 | 1.23 | 0.11 | 0.10 | 0.17 | | | 0.01 | 2.0 | 5.6 | 13.5 | | 18.5 | 1102 | | ○ | 3.7 | |
| Example 2 | 19.9 | 5.1 | 73.7 | 1.16 | | | 0.18 | | | | 2.1 | 4.5 | 16.2 | | | | | ○ | | |
| Example 3 | 10.6 | 12.2 | 76.1 | 0.90 | | | 0.15 | | | | | 5.2 | | | | | | | | |
| Example 4 | 11.2 | 11.8 | 75.9 | 0.89 | | | 0.15 | 0.05 | | | | | | | | | | | | |
| Example 5 | 11.2 | 11.2 | 76.4 | 0.85 | | | 0.15 | 0.03 | | | | | | | | | | | | |
| Example 6 | 11.9 | 10.9 | 76.2 | 0.84 | | | 0.15 | 0.02 | | 0.01 | | 3.8 | | | 4.3 | | | | | |
| Example 7 | 12.6 | 10.2 | 75.8 | 0.87 | | 0.04 | 0.14 | 0.01 | | | 2.1 | 3.2 | 3.1 | 15.7 | 3.2 | 870 | 126 | ○ | 4.4 | |
| Example 8 | 13.2 | 9.7 | 76.0 | 0.96 | | | 0.14 | | | | | | | | | | | | | |
| Example 9 | 13.9 | 8.7 | 76.3 | 0.88 | | | 0.16 | | | | 2.1 | 3.2 | 4.1 | 17.6 | 4.7 | | | ○ | | |
| Example 10 | 14.7 | 8.0 | 76.3 | 0.94 | | | 0.15 | | | | | 3.0 | | | | | | ○ | | |
| Example 11 | 15.2 | 7.3 | 76.4 | 0.91 | | 0.05 | 0.15 | 0.01 | | 0.01 | 2.9 | 2.5 | 5.4 | 12.1 | 5.2 | | | ○ | | |
| Example 12 | 15.3 | 7.8 | 75.8 | 1.00 | | | 0.11 | 0.01 | | 0.01 | | | | | | | | | 3.7 | |
| Example 13 | 16.1 | 7.1 | 75.7 | 0.93 | | | 0.15 | | | | 2.9 | 3.0 | 6.1 | 14.5 | 6.1 | 972 | 144 | ○ | | |
| Example 14 | 16.5 | 6.8 | 75.6 | 0.89 | | | 0.17 | 0.02 | | | 3.0 | | | | | | | ○ | | |
| Example 15 | 13.9 | 10.7 | 74.2 | 0.95 | | | 0.17 | 0.01 | | | 1.9 | | | | | | | | | |
| Example 16 | 16.0 | 5.2 | 77.8 | 0.82 | | | 0.16 | | | 0.01 | | 3.3 | | 4.3 | | | | ○ | 4.4 | |
| Example 17 | 15.1 | 5.9 | 78.0 | 0.84 | | | 0.13 | | | 0.01 | | 3.0 | 3.7 | 4.5 | 2.5 | | | ○ | 4.7 | |
| Example 18 | 14.5 | 6.5 | 77.9 | 0.88 | | | 0.14 | | | 0.01 | 2.2 | 2.8 | | 5.3 | 2.3 | | | ○ | 5.0 | 53.6 |
| Example 19 | 14.0 | 7.0 | 77.6 | 1.01 | | | 0.14 | | | 0.01 | 2.0 | 2.2 | 3.9 | 5.3 | 2.3 | | | ○ | 4.3 | 47.9 |
| Example 20 | 11.8 | 9.5 | 78.1 | 0.90 | | | 0.16 | | | 0.01 | 2.1 | 1.8 | 5.8 | 7.4 | 6.5 | 1350 | | ○ | 5.6 | 61.0 |
| Example 21 | 9.7 | 11.8 | 77.3 | 1.02 | | | 0.15 | | | 0.01 | 3.3 | 7.1 | | | | | | ○ | 4.4 | 58.2 |
| Example 22 | 11.0 | 10.0 | 77.9 | 0.97 | | | 0.13 | | | | 6.7 | 9.9 | | | | | | ○ | | |
| Example 23 | 11.2 | 9.7 | 77.9 | 1.06 | | | 0.17 | | | | 4.6 | 8.8 | | | | | | ○ | | |
| Example 24 | 11.5 | 9.2 | 78.1 | 1.06 | | | 0.14 | | | | 6.2 | 7.7 | | | | | | ○ | | |
| Example 25 | 11.6 | 9.4 | 77.9 | 0.94 | | 0.05 | 0.16 | | | | 5.5 | 7.2 | | | | | | ○ | 5.0 | 56.4 |
| Example 26 | 12.5 | 8.3 | 78.1 | 1.01 | | | 0.13 | | | | 3.9 | 7.1 | | 10.6 | 7.5 | 1323 | 167 | ○ | | |
| Example 27 | 13.7 | 7.1 | 78.1 | 0.96 | | | 0.12 | | | | 5.3 | 6.3 | | | | | | ○ | 4.5 | |
| Example 28 | 13.9 | 7.0 | 77.9 | 1.07 | | | 0.15 | | | | 5.6 | 8.2 | | | | 1424 | 165 | ○ | 4.8 | |
| Example 29 | 14.2 | 6.6 | 78.1 | 0.96 | | | 0.16 | | | | | 8.5 | | | 7.9 | | | ○ | | |
| Example 30 | 14.3 | 6.1 | 78.4 | 0.99 | | | 0.18 | | | | | 9.9 | | | | | | ○ | 4.2 | |
| Example 31 | 13.4 | 8.6 | 76.8 | 0.90 | | | 0.15 | | | | 4.7 | 5.8 | | | | 1288 | | ○ | 4.8 | |
| Example 32 | 12.6 | 9.3 | 76.9 | 0.98 | | | 0.15 | | | | 3.8 | 5.3 | | | 5.0 | | | ○ | 4.9 | |
| Example 33 | 12.6 | 9.6 | 76.6 | 0.95 | | | 0.18 | | | | 4.0 | 5.2 | | | | | | ○ | 4.9 | |
| Example 34 | 12.7 | 9.3 | 76.7 | 1.05 | | | 0.15 | | | | | | | | | 1414 | | ○ | 4.2 | |
| Example 35 | 12.4 | 9.9 | 76.5 | 0.99 | | | 0.16 | | | | | | | | | 1253 | | ○ | 3.6 | |
| Example 36 | 12.8 | 9.6 | 76.3 | 1.14 | | | 0.17 | | | | 4.9 | 6.7 | | | | 1385 | | ○ | 3.6 | |
| Example 37 | 12.8 | 9.1 | 76.8 | 1.05 | | | 0.16 | | | | 3.4 | 3.5 | | | | 1422 | | ○ | 4.0 | |
| Example 38 | 12.5 | 9.5 | 75.7 | 1.22 | | | 0.18 | | | | 3.2 | 4.4 | | | 4.3 | | | ○ | 4.3 | |
| Example 39 | 12.9 | 9.7 | 76.5 | 1.51 | | | 0.17 | | | | 3.2 | 4.4 | | | | 757 | | ○ | 4.3 | 70.1 |
| Example 40 | 12.5 | 9.3 | 76.5 | 1.52 | | | 0.14 | | | | 5.9 | 7.0 | | | 8.5 | | | ○ | 4.1 | 59.5 |
| Example 41 | 12.2 | 9.8 | 76.2 | 1.68 | | | 0.20 | | | | 1.8 | 2.0 | | | 3.4 | 542 | | ○ | 4.3 | 54.3 |
| Example 42 | 12.5 | 9.4 | 76.7 | 1.19 | | | 0.15 | | | | 1.2 | 1.5 | | | 2.1 | | | ○ | 5.0 | 63.8 |
| Example 43 | 12.7 | 9.5 | 76.3 | 1.07 | | | 0.16 | | | | 1.1 | 4.8 | | | 4.9 | 1307 | | ○ | | |
| Example 44 | 12.1 | 7.3 | 75.0 | 0.17 | 0.22 | | 0.12 | | | 5.08 | 0.7 | 4.3 | | | | | | ⊚ | 2.9 | |
| Example 45 | 11.6 | 7.0 | 76.4 | 0.39 | | | 0.10 | | | 4.30 | | | | | | | | ⊚ | | |

TABLE 1-continued

| | Composition (wt %) | | | | | | | | | | Shrinkage after heating for 8 hours (%) | | | Shrinkage after heating for 100 hours (%) | Solubility (unheated) | Solubility (after heating) | Alumina reactivity resistance | Average fiber diameter (μm) | Tensile strength (kPa) |
|---|---|---|---|---|---|---|---|---|---|---|---|---|---|---|---|---|---|---|---|
| | MgO | CaO | SiO2 | Al2O3 | Na2O | K2O | Fe2O3 | MoO3 | TiO2 | ZrO2 | 1200° C. | 1300° C. | 1350° C. | 1400° C. | 1300° C. | PH 7.4 | PH 7.4 | 1300° C. 8 h | | |
| Example 46 | 12.0 | 8.6 | 76.3 | 0.26 | | | 0.14 | | 2.44 | 0.20 | | 3.7 | | | | 791 | | ○ | | |
| Example 47 | 11.4 | 8.1 | 76.1 | 0.23 | | | 0.14 | | 3.68 | 0.28 | | 6.4 | | | | | | ○ | | |

TABLE 2

| | Composition (wt %) | | | | | | | | | | Shrinkage after heating for 8 hours (%) | | | | Shrinkage after heating for 100 hours (%) | Solubility (unheated) PH 7.4 | Solubility (after heating) PH 7.4 | Alumina reactivity resistance 1300° C. 8 h | Average fiber diameter (μm) | Tensile strength (kPa) |
|---|---|---|---|---|---|---|---|---|---|---|---|---|---|---|---|---|---|---|---|---|
| | MgO | CaO | SiO2 | Al2O3 | Na2O | K2O | Fe2O3 | MoO3 | TiO2 | ZrO2 | 1200° C. | 1300° C. | 1350° C. | 1400° C. | 1300° C. | | | | | |
| Example 48 | 11.3 | 8.0 | 75.5 | 0.31 | | | 0.14 | | 4.60 | 0.25 | 3.2 | 6.0 | | | | | | ○ | | |
| Example 49 | 10.8 | 8.5 | 74.4 | 0.28 | | | 0.16 | | 5.60 | 0.17 | | 6.2 | | | | | | ○ | | |
| Example 50 | 10.9 | 8.1 | 75.1 | 0.26 | | | 0.15 | | 5.15 | 0.15 | | 7.2 | | | | 511 | | ○ | 5.6 | |
| Example 51 | 11.5 | 8.9 | 75.3 | 0.28 | | | 0.14 | | 3.61 | 0.16 | | 4.6 | | | | | | ○ | | |
| Example 52 | 12.3 | 8.7 | 75.5 | 0.26 | | | 0.17 | | 2.80 | 0.21 | | 3.3 | | | | | | ○ | | |
| Example 53 | 12.4 | 12.4 | 75.1 | 2.20 | | | 0.15 | | | | 2.9 | 9.9 | | | | | | ○ | | |
| Example 54 | 10.1 | 9.7 | 76.9 | 0.85 | | | 0.15 | | | 0.01 | 2.2 | 2.1 | 6.9 | 8.8 | 2.5 | 1614 | | ○ | 3.7 | |
| Example 55 | 12.3 | 9.9 | 76.7 | 0.93 | | | 0.14 | | | 0.06 | 2.2 | 2.4 | 6.5 | 8.7 | 2.6 | 1818 | | ○ | 5.6 | |
| Example 56 | 12.4 | 10.3 | 75.8 | 0.94 | | 0.05 | 0.13 | | | 0.25 | 2.9 | 3.3 | | | | | | ○ | | |
| Example 57 | 12.2 | 10.1 | 76.2 | 0.93 | | | 0.14 | | | 0.41 | | 5.1 | | | | | | ○ | | |
| Example 58 | 12.5 | 10.1 | 75.7 | 1.06 | | 0.05 | 0.12 | | | 0.49 | 3.1 | 5.2 | | | | | | ○ | | |
| Example 59 | 12.9 | 9.7 | 75.7 | 0.92 | | | 0.18 | | | 0.56 | | 4.4 | | | | | | ○ | 3.9 | |
| Example 60 | 12.3 | 10.5 | 75.1 | 0.97 | | | 0.16 | | | 0.89 | | 4.9 | | | | | | ○ | | |
| Example 61 | 12.5 | 9.6 | 75.7 | 1.01 | | | 0.16 | | | 1.00 | 3.6 | 5.3 | | | | 935 | | ○ | 3.4 | |
| Example 62 | 12.2 | 9.8 | 75.8 | 1.01 | 0.18 | | 0.15 | | | 1.10 | | 5.2 | | | | | | ○ | | |
| Example 63 | 12.4 | 9.5 | 75.8 | 1.03 | 0.21 | | 0.14 | | | 1.10 | | 5.5 | | | | | | ○ | | |
| Example 64 | 12.3 | 9.6 | 75.8 | 0.97 | 0.23 | | 0.14 | | | 1.14 | | 9.8 | | | | | | ○ | | |
| Example 65 | 12.3 | 9.5 | 75.8 | 0.96 | 0.15 | | 0.17 | | | 1.19 | 4.5 | 7.4 | | | | | | ○ | | |
| Example 66 | 12.5 | 9.1 | 75.9 | 1.13 | 0.25 | | 0.14 | | | 1.10 | 5.1 | 7.4 | | | | | | ○ | | |
| Example 67 | 12.4 | 8.9 | 75.7 | 1.13 | 0.15 | | 0.14 | | | 1.08 | 4.9 | 7.1 | | | | | | ○ | | |
| Example 68 | 12.8 | 9.5 | 75.3 | 0.76 | 0.23 | | 0.16 | | | 1.22 | 5.6 | 7.3 | | | | | | ○ | | |
| Example 69 | 12.9 | 9.8 | 75.1 | 0.66 | 0.15 | | 0.18 | | | 1.17 | 4.8 | 6.7 | | | | | | ○ | | |
| Example 70 | 13.0 | 9.7 | 75.0 | 0.51 | 0.25 | | 0.16 | | | 1.21 | 4.3 | 6.9 | | | | | | ○ | 3.9 | |
| Example 71 | 12.6 | 9.6 | 75.8 | 0.51 | 0.15 | 0.06 | 0.16 | | | 1.20 | 3.2 | 5.1 | | | | | | ○ | | |
| Example 72 | 12.8 | 9.9 | 75.2 | 0.40 | 0.22 | | 0.16 | | | 1.20 | 3.0 | 5.3 | | | | | | ○ | | |
| Example 73 | 12.8 | 9.5 | 75.7 | 0.47 | 0.28 | | 0.14 | | | 1.04 | 3.8 | 5.4 | | | | | | ○ | | |
| Example 74 | 13.0 | 10.1 | 75.1 | 0.60 | 0.25 | | 0.16 | | | 0.80 | 4.8 | 8.2 | | | | | | ○ | | |
| Example 75 | 12.8 | 9.6 | 76.1 | 0.71 | 0.15 | | 0.15 | | | 0.50 | 2.2 | 2.4 | | | | | | ○ | | |
| Example 76 | 13.2 | 9.2 | 76.1 | 0.86 | 0.16 | | 0.15 | | | 0.29 | | 1.4 | | | | | | ○ | | |
| Example 77 | 12.8 | 10.2 | 75.5 | 0.83 | 0.27 | | 0.17 | | | 0.19 | 1.8 | 2.7 | | | | | | ○ | | |
| Example 78 | 13.3 | 9.7 | 75.5 | 0.95 | 0.21 | 0.05 | 0.16 | | | 0.08 | 1.2 | 1.9 | 13.4 | 14.6 | 4.9 | 1457 | | ○ | 2.9 | |
| Example 79 | 12.9 | 10.2 | 75.4 | 0.91 | 0.26 | | 0.15 | | | 0.08 | 1.2 | 2.1 | 13.6 | | 3.5 | 1586 | 26 | ○ | | |
| Example 80 | 13.1 | 9.9 | 75.5 | 1.00 | 0.25 | | 0.16 | | | 0.06 | 3.3 | 4.5 | 11.6 | 13.6 | 7.4 | 1558 | 1437 | ○ | 3.6 | 19.4 |
| Comp. Ex. 1 | 17.9 | 4.3 | 75.9 | 1.58 | | 0.21 | 0.13 | | | 0.01 | 2.2 | 3.0 | 7.6 | 8.4 | 6.4 | 610 | | × | 3.3 | 44.4 |
| Comp. Ex. 2 | 0.4 | 25.0 | 71.9 | 2.33 | | 0.10 | 0.19 | | | 0.01 | 1.5 | 2.2 | 11.7 | 21.8 | 2.7 | 330 | | × | 3.1 | 74.2 |
| Comp. Ex. 3 | 0.2 | 43.6 | 43.6 | 34.05 | 0.20 | | 0.06 | | | | 1.5 | 2.2 | 2.9 | 3.1 | 4.0 | 8 | | ⊚ | 2.8 | 44.9 |
| Comp. Ex. 4 | 0.1 | 49.6 | 49.6 | 50.23 | | | 0.09 | | | 22.0 | 2.6 | 3.5 | 4.3 | 4.6 | 3.6 | 21 | | ⊚ | 2.2 | 32.8 |
| Comp. Ex. 5 | 0.6 | 26.2 | 70.7 | 1.52 | | 0.79 | 0.30 | | | | 0.8 | 2.6 | 9.1 | 23.9 | 12.7 | 280 | 1520 | × | 4.6 | 39.7 |
| Comp. Ex. 6 | 0.7 | 27.4 | 69.0 | 1.66 | | 0.86 | 0.17 | | | | 1.4 | 7.3 | 13.6 | | | | | × | 4.8 | |
| Comp. Ex. 7 | 16.7 | 8.9 | 73.0 | 1.21 | | | 0.19 | | | 0.04 | 2.3 | | | | | | | × | | |
| Comp. Ex. 8 | 14.2 | 11.1 | 73.4 | 1.08 | | 0.07 | 0.20 | 0.01 | | 0.01 | 1.7 | 2.4 | | | | | | × | | |
| Comp. Ex. 9 | 12.5 | 13.6 | 72.6 | 1.00 | | 0.06 | 0.16 | 0.01 | | | 2.0 | 2.2 | 12.7 | | 10.1 | 650 | | × | 3.0 | |
| Comp. Ex. 10 | 12.3 | 12.9 | 73.6 | 0.97 | | 0.05 | 0.17 | 0.01 | | | 2.0 | | | | | | | × | | |
| Comp. Ex. 11 | 11.8 | 13.3 | 73.6 | 1.00 | | 0.06 | 0.17 | 0.01 | | | 2.0 | | | | | | | × | | |

TABLE 2-continued

| | Composition (wt %) | | | | | | | | | Shrinkage after heating for 8 hours (%) | | | Shrinkage after heating for 100 hours (%) | Solubility (unheated) | Solubility (after heating) | Alumina reactivity resistance 1300° C. | Average fiber diameter | Tensile strength |
|---|---|---|---|---|---|---|---|---|---|---|---|---|---|---|---|---|---|---|
| | MgO | CaO | SiO2 | Al2O3 | Na2O | K2O | Fe2O3 | MoO3 | TiO2 | ZrO2 | 1200° C. | 1300° C. | 1350° C. 1400° C. | 1300° C. | PH 7.4 | PH 7.4 | 8 h | (μm) | (kPa) |
| Comp. Ex. 12 | 11.7 | 14.2 | 73.0 | 0.91 | | | 0.12 | 0.01 | | | 2.0 | | | | | | X | | |
| Comp. Ex. 13 | 11.4 | 15.4 | 71.9 | 0.92 | | 0.05 | 0.22 | 0.01 | | | 1.6 | 2.7 | | 6.1 | | | X | | |
| Comp. Ex. 14 | 11.8 | 14.5 | 72.8 | 0.57 | | | 0.20 | 0.01 | | 0.01 | 1.3 | 2.7 | | | | | X | | |

INDUSTRIAL APPLICABILITY

The inorganic fibers of the invention can be used for various applications as a heat insulating material or a substitute for asbestos.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification are incorporated herein by reference in its entirety.

The invention claimed is:

1. Inorganic fibers comprising the following composition, $SiO_2$, MgO and CaO being main components:
   $SiO_2$: 73.6 wt % to 85.9 wt %
   MgO: 9.0 wt % to 15.0 wt %
   CaO: 5.1 wt % to 9.4 wt %
   $Al_2O_3$: 0 wt % or more and less than 2.3 wt %
   $Fe_2O_3$: 0 wt % to 0.50 wt %
   SrO: less than 0.1 wt %.

2. The inorganic fibers according to claim 1, which comprise the following composition:
   $SiO_2$: 74.0 wt % to 80.0 wt %
   MgO: 9.0 wt % to 15.0 wt %
   CaO: 5.1 wt % to 9.4 wt %
   $Al_2O_3$: 0 wt % or more and less than 2.3 wt %
   $Fe_2O_3$: 0 wt % to 0.50 wt %
   SrO: less than 0.1 wt %.

3. The inorganic fibers according to claim 1, which comprise MgO in an amount of 9.0 wt % to 14.0 wt %.

4. The inorganic fibers according to claim 1, which do not comprise MgO in an amount of 10.0wt % to 14.0 wt %.

5. The inorganic fibers according to claim 1, which do not comprise MgO in an amount of 11.0wt % to 14.0 wt %.

6. The inorganic fibers according to claim 1, which comprise $Al_2O_3$ in an amount of 0.17 wt % to 2.2 wt %.

7. The inorganic fibers according to claim 1, which comprise $ZrO_2$ in an amount of more than 0.1 wt % and 10.9 wt % or less.

8. The inorganic fibers according to claim 1, which comprise $TiO_2$ in an amount of more than 0.1 wt % and 10.9 wt % or less.

9. The inorganic fibers according to claim 1, which comprise alkali metal oxide in an amount of more than 0.01 mol % and less than 0.20 mol %.

10. The inorganic fibers according to claim 1, which comprise $B_2O_3$ in an amount of less than 0.1 wt %.

11. The inorganic fibers according to claim 1, wherein the total of the amounts of $SiO_2$, MgO and CaO is 90.0 wt % or more.

12. The inorganic fibers according to claim 1, wherein the total of the amounts of $SiO_2$, MgO and CaO is 93.0 wt % or more.

13. The inorganic fibers according to claim 1, wherein the total of the amounts of $SiO_2$, MgO and CaO is 96.0 wt % or more.

14. The inorganic fibers according to claim 1, which do not comprise SrO.

15. The inorganic fibers according to claim 1, which comprise $SiO_2$ in an amount of 74.2wt % to 85.9 wt %.

16. A secondary product or composite material produced by using the inorganic fibers according to claim 1.

* * * * *